April 14, 1942.  W. J. PRYOR  2,279,952
DENTURE MOLD
Filed April 18, 1940

INVENTOR.
WALTER J. PRYOR
BY
Kurs Hudson Kent
ATTORNEYS

Patented Apr. 14, 1942

2,279,952

UNITED STATES PATENT OFFICE 2,279,952

DENTURE MOLD

Walter J. Pryor, Cleveland, Ohio

Application April 18, 1940, Serial No. 330,351

4 Claims. (Cl. 18—5.7)

This invention relates to molding apparatus, and more particularly to an improved mold for use in making artificial dentures from plastic material.

In the manufacture of artificial dentures plastic materials such as methyl methacrylate, other synthetic resins and rubber are commonly used which are subject to shrinkage during curing or polymerization and certain undesirable effects frequently result from such shrinkage. The shrinking of the material may cause the denture to be slightly smaller in size than is desired or necessary for a perfect fit. Shrinking of the material also causes severe stresses to be set up in the article which, at times, have resulted in cracking or breaking of the artificial teeth or in cracking of the body or plate portion of the denture. As will be presently explained in detail, my improved dental mold not only overcomes the difficulties mentioned but produces stronger and more accurately shaped dentures than have been obtainable heretofore.

An object of my invention is to provide an improved mold having novel means for maintaining plastic material under pressure during curing thereof whereby the undesirable effects of shrinkage of the material are avoided.

Another object of my invention is to provide an improved mold, of the character mentioned, having means for maintaining the material in the mold cavity under pressure and for causing additional material to be forced into the cavity during the curing operation to compensate for shrinkage.

My invention may be further briefly summarized as consisting in certain novel combinations and arrangements of parts hereinafter described and particularly set out in the appended claims.

The construction and manner of use of my improved molding apparatus will now be described more in detail, but before proceeding with the detailed description, it should be understood that although I have illustrated but one embodiment of my apparatus, and have shown the same applied to the molding of artificial dentures, the invention may be embodied in other forms of similar apparatus and may be applied to the molding of various other articles.

Figure 3:
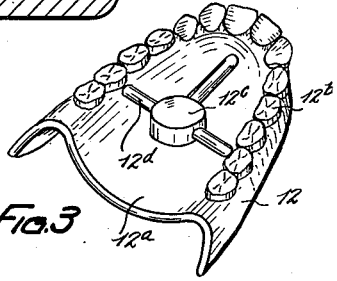
Fig. 3 is a perspective view showing an artificial denture as produced by the molding apparatus of Fig. 1.
Figure 2:
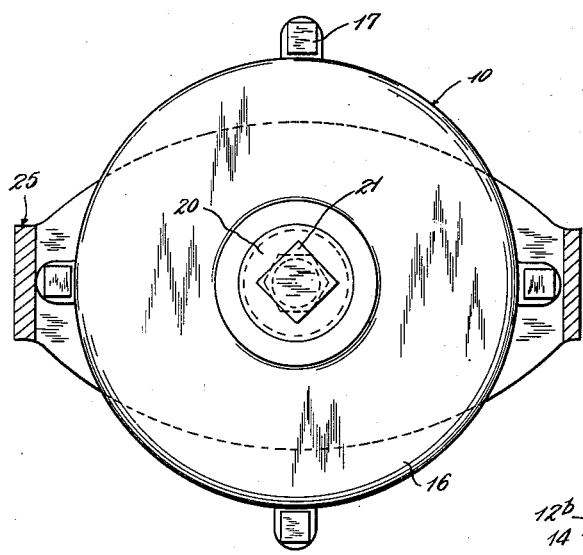
Fig. 2 is a transverse sectional view taken on line 2—2 of Fig. 1.

My improved molding apparatus comprises in general a mold 10 having a mold cavity 11 therein adapted to receive a quantity of the plastic material from which the article is to be molded, and a means for maintaining the material under pressure in the mold cavity and for forcing additional material into the mold cavity during the curing operation to thereby compensate for shrinkage of the material. The mold cavity 11 conforms in shape to the article to be produced, in this instance an artificial denture 12 as shown in Fig. 3.

The denture 12 may comprise a molded body or plate portion 12a and a set of teeth 12b formed of porcelain or other suitable material and held by such plate portion. As the denture is delivered from the mold cavity 11 it also has an integral extension or gate section comprising a stem or post 12c and arms 12d connecting the same with the plate portion. This extension or gate section is formed by mold passages 13 and 14, which communicate with the cavity 11 for a purpose to be presently explained, and is detached from the denture after the latter is removed from the mold.

As shown in the drawing, the mold 10 may comprise a hollow flask formed of bottom and top sections 15 and 16 adapted to be secured together by suitable bolts 17 and having therein bodies 18 and 19 of plaster of Paris or other appropriate mold forming material. The top wall of the upper flask section 16 may have a nut or bushing 20 screwed or otherwise mounted therein and provided with an opening in which a plunger 21 is slidable for a purpose to be hereinafter explained. Portions of the bodies 18 and 19 cooperate to form the mold cavity which, except for the communication provided by the passages 13 and 14, is closed when the mold sections are secured together. The plaster body 18 of the lower mold section is preformed so that the top thereof corresponds in shape with the patient's gums and the roof of his mouth and is then mounted in the lower section 15 of the flask by means of a quantity of cementitious filling material 18a.

The plaster body 19 may be previously cast in the upper section 16 of the flask so as to provide the same with the passages 13 and 14 and with portions which will cooperate with the top of the body 18 to form the mold cavity 11. The body 19 also carries the set of artificial teeth 12b which have their tops embedded therein and whose lower ends project into the cavity 11. The mounting of the teeth in the body 19 and the forming of the cavity-defining portions thereon may be accomplished in any suitable manner known to those skilled in the dental art.

Figure 1:
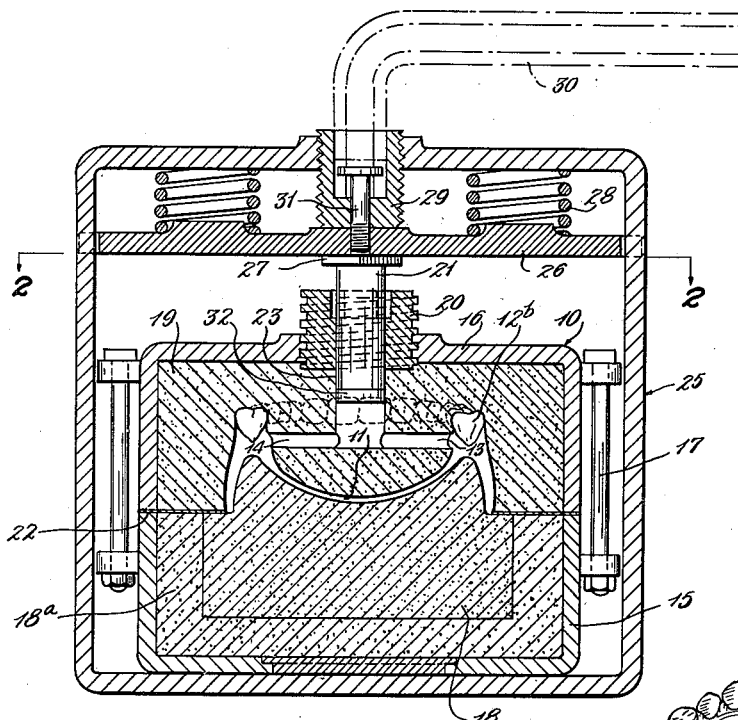
Fig. 1 is a vertical sectional view taken through denture molding apparatus embodying my invention.

One way of accomplishing this is by first building up in wax on the body 18 a structure (not shown) corresponding with the plate portion of the denture to be formed and mounting the artificial teeth 12b in proper relation on this wax structure. The wax structure may also include portions corresponding with the extension portions 12c and 12d of the denture 12 of Fig. 3, the portion 12c preferably being in alignment with the plunger 21 and of the same size and shape. The space in the flask section 16 surrounding this wax structure and the plunger 21 is then filled with plaster of Paris or the like to form the body 19, a parting line or plane 22 being maintained between the upper and lower mold sections. The wax is then dissolved or otherwise removed from the body 19 leaving the cavity-defining portions and the passages 13 and 14, and also leaving the artificial teeth 12b with their top portions firmly embedded in the plaster and with their lower ends extending into the mold cavity 11, as shown in Fig. 1.

In the use of my molding apparatus a mold having the cavity 11 and the teeth 12b therein is first formed in the flask, as in the manner above explained, after which plastic material, such as methyl methacrylate, a rubber composition or other material from which the article is to be molded, is packed into the mold cavity and one or more trial closures of the flask made to ascertain that the mold is amply filled with the uncured plastic material. Some of the plastic material is also caused to enter and fill the passages 13 and 14, and to extend part way into the aligned passage 23 formed in the body 19 by the plunger 21. The sections of the flask are then secured together by means of the bolts 17 and the plunger 21 is inserted through the opening of the bushing 20. The curing operation is then started by supplying heat or other appropriate curing agent to the assembled and charged mold.

During the curing operation I apply pressure to the plastic material by means of the plunger 21 which is progressively or from time to time moved further into the mold so as to maintain the material in the mold cavity under substantially constant pressure and to force additional material into the mold cavity from the passages 13 and 14 to thereby compensate for shrinkage of the material during curing or polymerization. The pressure may be applied to the plunger 21 by any suitable means, such as by a frame or press 25 in which the mold 10 is placed and which has a movable plate 26 engageable with the head 27 of the plunger. Compression springs 28 may be arranged to act on the plate 26 to impart inward movement to the plunger and to maintain the substantially constant pressure on the plastic material. The action of the springs 28 may be controlled or varied by means of a threaded member 29 which may be screwed inwardly or outwardly through the top portion of the frame 25 by means of a suitable wrench 30. The plate 26 may be prevented from dropping away from the springs 28 by means of a connecting screw 31 which provides a lost motion connection between the plate and the threaded member 29.

When the plunger 21 is made of metal a transfer of heat may take place more rapidly than is desired between the plunger and the plastic material, and to prevent this I may provide an insulating and packing disk 32 at the inner end of the plunger for contact with the body of plastic material in the plunger passage. This insulating disk may be formed of a suitable rubber composition, or any other appropriate material.

After the curing operation is completed, the pressure of the springs 28 on the plunger is released by screwing the member 29 outwardly to lift the plate 26 and the mold 10 is then removed from the frame 25. The mold sections are then separated and the molded article removed from the upper mold section by breaking of the plaster body 19 if necessary. The artificial teeth are now firmly held by the solidified material forming the plate portion 12a and constitute a permanent part of the denture shown in Fig. 3.

Figure 4:
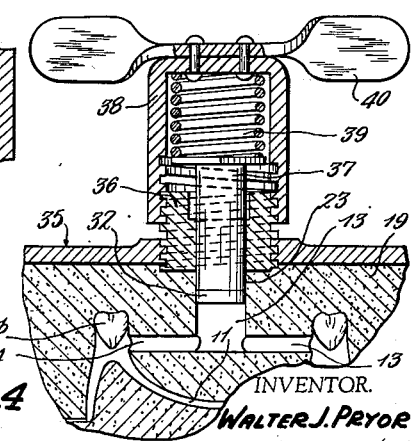
Fig. 4 is a partial sectional elevation showing a modified form of my molding apparatus.

In Fig. 4 I show another form of my molding apparatus embodying the principles and features already described but in which more simplified means is provided for applying the pressure to the plastic material. This modified apparatus includes a mold 35 which is substantially identical with the mold 10 described above and has a bushing or nut 36 screwed into the top wall of the flask and a plunger 37 operable for the purpose above explained and extending into the mold through this bushing or nut. For applying pressure to the plunger I provide a cup-like member or cover 38 which is screwed onto the bushing 36 and houses a spring 39 which exerts pressure on the plunger. The cover 38 may have a handle portion 40 by which it can be conveniently rotated for screwing it inwardly or outwardly of the bushing 36 to thereby regulate the spring pressure on the plunger.

From the foregoing description and the accompanying drawing, it will now be readily seen that I have provided improved apparatus for molding artificial dentures or other articles and in which provision is made for compensating for the shrinkage which usually occurs in the plastic material being molded. It will also be seen that such shrinkage compensation is obtained by providing means for maintaining a substantially constant pressure on the plastic material during the curing thereof and also forcing additional material into the mold cavity while such pressure is being maintained. It will be understood further, that since I substantially eliminate shrinkage of the material, I also eliminate the undesirable stresses and breakage usually caused by shrinkage and am able to produce dentures, or other molded articles, of stronger and more accurate form. With the mold construction which I have provided it will also be seen that the additional or reserve supply of uncured plastic material is located interiorly of the mold and hence will not cure too rapidly to permit material to be forced into the mold cavity during substantially the entire curing operation to compensate for shrinkage.

While I have illustrated and described my improved molding apparatus in a more or less detailed manner, it will be understood, of course, that I do not wish to be limited to the details of construction or to the particular form of the apparatus herein disclosed, but regard my invention as including such changes and modifications as do not constitute a departure from the spirit of the invention and the scope of the appended claims.

Having thus described my invention, I claim:

1. In molding apparatus of the character described, a mold flask containing a mold having therein a cavity adapted to receive material to be molded and cured and a passage communicating with said cavity and also adapted to receive some of said material, said flask having a threaded portion and a plunger extending therethrough into said passage, a spring acting on the plunger to cause the same to exert pressure on the material in said passage so as to maintain said cavity filled during the curing of the material, and a hollow member housing said spring and having adjustable screw connection with said threaded portion for varying the compression of said spring.

2. In molding apparatus for producing artificial dentures from moldable material of the kind which shrinks during curing or polymerization, a mold having a denture forming cavity therein adapted to be filled with said moldable material, means providing a cylindrical chamber extending into the mold and adapted to contain an additional supply of said moldable material and at its inner end having communication with the mold cavity, a plunger movable in said cylindrical chamber and having its outer end projecting from the mold, and pressure applying means exterior of the mold including a spring adapted to apply pressure to the plunger to maintain the mold cavity filled with said material during said curing.

3. In molding apparatus for producing artificial dentures from moldable material of the kind which shrinks during curing or polymerization, a flask having a bushing screwed into a wall opening thereof, a mold in the flask having a denture forming cavity therein adapted to be filled with said moldable material and a cylindrical chamber substantially aligned with the opening of said bushing, said chamber being adapted to contain an additional supply of said moldable material and at its inner end having communication with said cavity, a plunger movable in said chamber and bushing and having its outer end projecting from the latter and provided with a head, a spring seating against the plunger head, and a hollow member housing said spring and having adjustable screw connection with said bushing for varying the compression of the spring, said spring and plunger being adapted to act to maintain said cavity filled with said moldable material.

4. In molding apparatus for producing artificial dentures from moldable material of the kind which shrinks during curing or polymerization, a flask having a bushing screwed into a wall opening thereof, a mold in the flask having a denture forming cavity therein adapted to be filled with said moldable material, the opening of said bushing forming a chamber adapted to contain an additional supply of said moldable material and at its inner end having communication with said cavity, a plunger movable in said bushing opening and having its outer end projecting from the latter, and a pressure device containing a compression spring and adapted to be applied to the flask and bushing assembly, said spring acting to apply pressure to said plunger and through the plunger to the material in said chamber so as to maintain said cavity filled with said moldable material during the curing of the material in the cavity.

WALTER J. PRYOR.